Jan. 9, 1934.    L. P. PIAZZOLI, JR    1,942,832
MOLD TRANSFERRING MECHANISM
Filed March 20, 1930    2 Sheets-Sheet 1
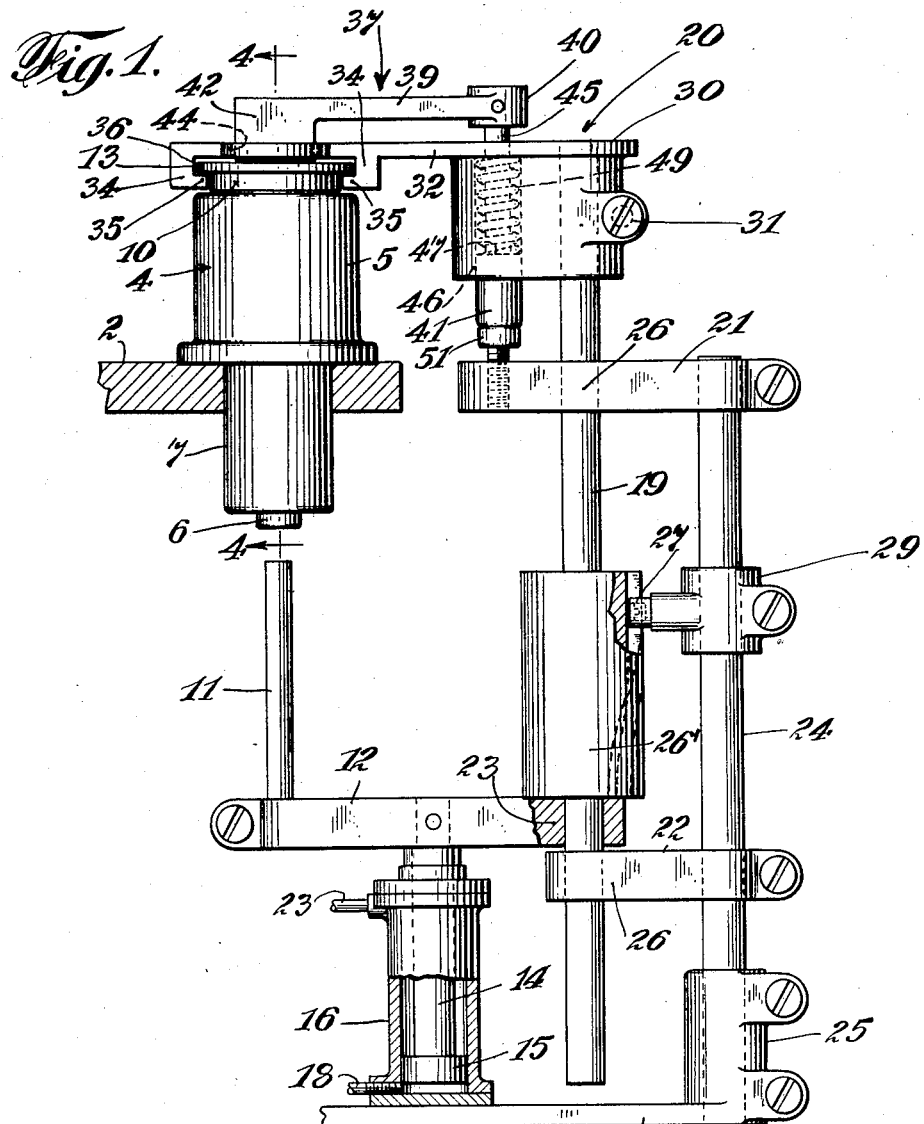
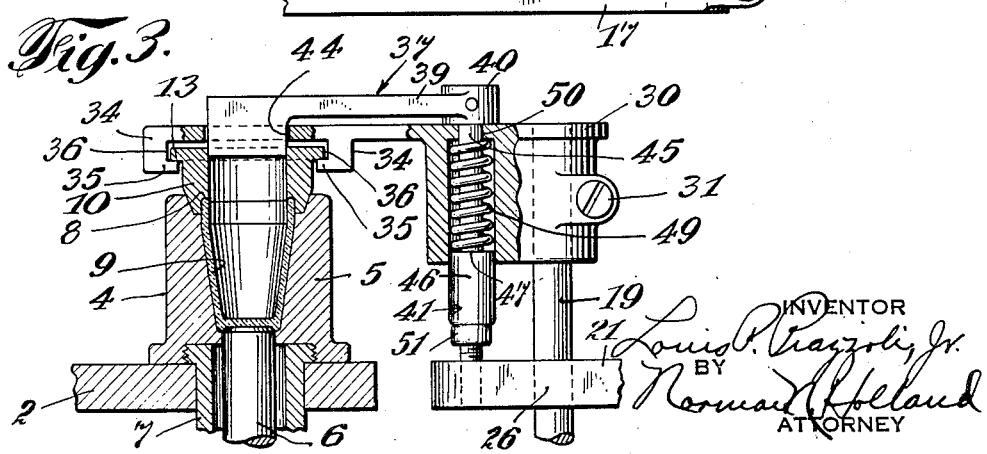

Jan. 9, 1934.  L. P. PIAZZOLI, JR  1,942,832
MOLD TRANSFERRING MECHANISM
Filed March 20, 1930   2 Sheets-Sheet 2

Patented Jan. 9, 1934

1,942,832

UNITED STATES PATENT OFFICE 1,942,832

MOLD TRANSFERRING MECHANISM

Louis P. Piazzoli, Jr., Connellsville, Pa., assignor to Capstan Glass Company, Connellsville, Pa., a corporation of Delaware Application March 20, 1930. Serial No. 437,363

22 Claims. (Cl. 49—14)

The present invention relates to transferring mechanisms and more particularly to a transferring mechanism for a ring mold associated with a glass fabricating machine.

In the manufacture of glass containers such as tumblers and the like, the ware is usually pressed. The molds best suited for the manufacture of glass containers such as tumblers and the like comprise a blank mold which forms the body portion of the tumblers and a ring mold which forms the upper portion and the rim of the tumblers. In operation, the ring mold is placed upon the body mold to form the shape of the ware to be fabricated. A gob of glass is then dropped into the mold and a vertical plunger conforming to the shape of the inner side walls of the ware is projected into the mold, thereby pressing out the glass to the shape of a mold. In order to remove the ware, the ring mold must first be lifted from the main mold.

It has been customary, heretofore, to station an operator at the takeout position to remove the ring molds with a pair of tongs or other suitable gripping tool and to replace them after the ware was removed. Since tumblers are usually manufactured at a rapid rate, this operation is very tedious and requires the full time of a skilled operator. The heavy, hot molds are a hazard to the operator and to others, due to their being dropped from time to time. Such dropping also contaminates the molds and the ware which may thereafter be formed in such molds.

The present invention aims to overcome these difficulties by providing a mechanism that will automatically engage the ring molds, remove them from the lower or main mold and replace them after the ware has been removed.

An object of the present invention is to provide a mechanism for removing and replacing the molds of a fabricating machine.

Another object of the invention is to reduce the cost of manufacturing glassware by minimizing the labor required.

Another object of the invention is to provide a device which will co-operate with existing glass machines to increase the output thereof.

Another object of the invention is to eliminate the breakage and contamination of mold parts by providing a mechanism for preventing the ring mold from falling on the floor while being removed and replaced.

A further object of the invention is to provide a mold holder lift mechanism readily applicable to existing machines which will co-operate with a takeout mechanism and will eject the ware from the molds.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a side elevational view, partly in section, of the present invention;

Fig. 2 is a perspective view of the ring mold engaging device applied to a common form of mold table for manufacturing glass vessels;

Fig. 3 is a sectional elevation, taken along the line 3—3 of Fig. 2, showing the locking mechanism engaging a ring mold; and Fig. 4 is a sectional view, taken at right angles to the section of Fig. 3, showing a slightly different form of locking mechanism.

The present embodiment of the invention is shown applied to a common form of fabricating machine for glassware having suitable molds in which the molten glass is pressed to form containers. The mechanism is adapted to remove the ring mold so that containers such as tumblers may be removed from the lower mold. The mechanism may be used in conjunction with the takeout device described in application Serial No. 255,877, owned by the assignee of this application. The operations of the present embodiment are entirely automatic and are timed in accordance with the fabricating and takeout machines and do not slow up the speed of these machines.

Referring to the drawings, there is shown a portion of a fabricating machine for molding glass containers, comprising an intermittently rotating mold table 2, with a series of molds 4 thereon. In Figs. 3 and 4, a common form of mold is shown in section. The mold may be of any desired form but, preferably, comprises an upper member 5 with a plunger 6 having a head at the upper end thereof fitting into and closing the bottom of the mold. The plunger 6 is supported by a lower mold member 7 which is threaded to the upper member to position the mold on the table 2. The member 5 is adapted to form the body portion of a container 9 and supports a ring mold 10 which is adapted to form the mouth of the container.

The ring mold 10 usually comprises an annular member, slightly tapered at the lower portion, which is adapted to nest into a corresponding tapered portion at the upper end of the mold 5. A groove 8 is located at the inner portion of the ring mold whereby the lip of the container is formed. An outwardly extending circumferential flange 13, at the upper end of the ring mold 10, presents means whereby the ring mold may be readily engaged.

When the mold reaches the takeout position, the ring mold 10 is removed by a device to be described hereinafter and the molded vessel 9 is raised upwardly by the plunger 6. The plunger is operated by a rod 11 mounted upon an arm 12 connected to a piston rod 14 and a piston 15 of an air cylinder 16. The air cylinder 16 is bolted to a suitable base construction 17 or may be cast integral therewith. The base 17 is adapted to be secured to the floor or any other foundation. The air cylinder 16 is operated by a pair of suitable valves, not shown herein, which permit compressed air to enter into the cylinder through the apertures 18 and 23 at desired intervals. The valves are controlled by the movement of the mold table and are automatic. The control mechanism referred to herein is well-known to the art and need not be described in detail.

Heretofore, it has been customary to remove the ring molds 10 manually. A laborer was stationed at the takeout position to remove the ring molds with a pair of tongs and to pass them to the mold members from which the ware had been ejected. The ring lift mechanism of the present invention eliminates this manual operation.

Referring more particularly to Fig. 1 of the drawings, the horizontal arm 12 mounted upon the piston rod 14 extends laterally from the piston rod connection and has a bearing 23 in its end. A vertical shaft 19 is rotatably mounted upon the arm 12 in bearing 23 and supports the ring mold engaging device 20 at its upper end. The shaft 19 is held in position by a pair of arms 21 and 22 secured to a vertical supporting column 24 mounted in the collar 25 cast integral with the base 17.

The shaft 19 is adapted to slide through the bearing portions 26 of the arms 21 and 22 and impart vertical movement to the device 20 when the ring molds are engaged and the air cylinder is operated to eject the ware from the molds. A cylindrical cam member 26' is mounted on the shaft 19 and engages a cam roller 27 adjustably mounted by means of a sleeve 29 secured to the column 24. The cam and cam roller rotate the shaft 19 through a desired angle when the shaft 19 is raised or lowered by the piston 15.

The ring mold engaging device 20 may comprise a hub portion 30, secured by a bolt 31 to the shaft 19, and a horizontal arm 32 extending outwardly from the hub 30. The bolt 31 permits the arm to be adjusted in proper position on the shaft 19 with respect to the mold table for its proper operation. The arm 32 has a pair of fingers 34 at the end thereof adapted to engage the ring molds. The fingers are preferably cast integral with the arm 32 but may be secured thereto by suitable means, if so desired. The fingers comprise a substantially angular, projecting portion 35 forming a slot or groove 36 between the arm 32. The fingers 34 of the arm 32, when it is in idle position, are directly above the takeout station of the several molds, and the slots 36 are in the same horizontal plane as the outwardly extending ledges 13 of the ring molds. As a ring mold approaches the takeout position, the flange 13 thereof slides into engagement with the fingers 34 and the ring mold may be raised from the main mold for removal of the ware by operation of the air cylinder 16. When the lifting device and the ring molds are raised, the cam 26 on the shaft 19 automatically rotates them out of vertical alignment with the main molds.

When the ring molds 10 are engaged by the fingers 34 and raised and swung outwardly, there is a tendency for the molds to slip, due to the inertia of the ring mold. To avoid serious consequences, which may result from the ring molds slipping out of engagement with the fingers, the present invention provides a device 37 for locking the molds to the oscillating arm.

The locking device may comprise a horizontal arm 39 having a hub portion 40 connected to a rod 41 extending upwardly through the hub portion 30 of the arm 32. At the free end of the arm 39, a downwardly projecting portion 42 is formed adapted to fit into a recess 44 in the arm 32 intermediate the engaging fingers and is adapted to extend into the centrally disposed recess of the ring molds when these molds are raised. The rod 41 is substantially smaller in diameter at its upper end 45 and merges into a portion of larger diameter at the lower end 46. The enlarged portion 46 presents a shoulder 47 adapted to retain a spring member 49 coiled about the upper end of the plunger intermediate the shoulder 47 and the lower surface of the arm 32. When the locking device is in idle position, the lower end of the rod 41 is adapted to rest upon a set screw or seat 51 attached to the end of the upper guiding arm 21. When the shaft 19 raises the arm 32, the plunger 41 and the locking arm 39 drop by gravity and under the influence of the spring 49. The projecting portion 42 then engages the ring molds. Likewise, when the arm 32 descends, the rod 41 is seated upon and raised by set screw 51 which raises the arm 39 out of effective relation with the ring mold. This permits the ring mold to slide off the supports 35 when the table is rotated to present the next mold.

In Fig. 4, a slightly different form of mechanism is shown for locking the ring molds to the transferring arm 32. In this figure, a pair of downwardly extending fingers 48, integral with the arm 39' or connected thereto by suitable means, engage the outer periphery of the ring mold when the arm 39' is lowered. To prevent the arm 39' and the fingers 48 from oscillating in a horizontal plane, a pin 52 is provided at the lower portion of the arm 39', projecting into a suitable aperture 53 in the arm 32. This type of locking device is particularly advantageous because the outer diameter of ring molds, for containers of various sizes, is usually constant; whereas, the inner periphery of the apertures 35 of the ring molds may vary in many instances. The operation of this form of locking mechanism is, otherwise, the same as that described with respect to Figs. 1, 2 and 3.

In the operation of the transferring mechanism, the mold table 2 is preferably operated intermittently. If the piston of the air cylinder and the engaging mechanism 20 are in a lowered position, as shown in Fig. 1, the locking device 37 is at its upper position and the engaging fingers 34 are substantially in the same horizontal plane as the projecting flanges 13 of the ring molds 10. As the molds approach the lifting device, the projecting flanges 13 slide into engagement with the fingers 34. The table stops with the ring mold in position to be lifted by the fingers 34. Air is admitted into the lower end 18 of the cylinder 16, against the piston, and the arm 32, through intermediation of the shaft 19, cross-arm 12 and piston rod 14, is raised upwardly. When the arm 32 has been raised slightly, the locking projection 42 drops into the inner periphery of the ring mold to lock the molds securely to the arm. This is caused by separation of the lower end of rod 41 and set screw 51, permitting the spring 49 to lower the arm 39. Upon further operation of the air cylinder, the cam 26 and cam roller 27 co-ordinate to rotate the shaft 19, thereby swinging the arm 32 away from the mold table. For effective operation, the arm 32 is preferably rotated about twenty or thirty degrees to permit the ware to be ejected. The desired rotation is preferably obtained by the design or shape of the groove in the cam 26. While the ring mold is removed, the rod 11 is operated simultaneously by the cylinder 16 to raise the plunger 6, thereby elevating the container 9. At this instance, the ware may be removed manually by means of tongs or by the takeout mechanism described in the assignee's co-pending application, S. N. 255,877.

After the ware has been removed, air may be introduced at the upper end 23 of the cylinder, thereby lowering the piston. The cam member again co-operates to swing the arm 32 to its original position. During the final movement of the piston, the arm 32 is lowered and the lower end of the rod 41 is seated upon the set screw 51. The locking arm 39 is raised in opposition to spring 49, thereby permitting the ring mold to rest freely on the main molds. The table 2 is again rotated to carry the ring mold, which has just been raised, out of engagement with the lifting device and to bring the succeeding mold into operative relation therewith so that it can be raised.

It will be seen that the invention herein described is simple in construction and effective in operation to remove ring molds from the molds of the commercial types of glass fabricating machines and particularly from mold tables operated intermittently. The ring mold engaging member comprises a pair of fingers and a locking device which prevents the mold from slipping or falling while being removed. The entire lifting mechanism is actuated by a single pneumatic cylinder which operates in timed relation with the fabricating machine. The arm which removes the mold is swung outwardly at a convenient angle to the takeout station. At the same time, the ware is raised by the elevating mechanism and can be readily removed either manually or by mechanical means. The present invention also eliminates the need of employing manual labor to remove and replace the ring molds. The automatic operation of the ring mold lift and its utility in conjunction with other labor saving mechanisms reduces the cost of manufacturing glassware substantially. The machine is ruggedly constructed and can withstand the rough usage to which it may be subjected.

As various changes may be made in the form, construction and arrangement of parts without departing from the spirit and scope of the invention and without sacrificing its advantages, it is to be understood that all matter herein is to be interpreted as illustrative and not in a limiting sense.

Having thus described my invention, I claim:

1. In a mold transferring device of the class described, the combination of an arm having stationary portions at the end thereof with longitudinal grooves therein forming fingers for engaging a ring mold and means for locking said ring mold on said arm.

2. In a device of the class described, the combination of a rotatable mold table, a ring mold having flanges thereon supported on said table, means normally in the path of the ring mold for engaging the flanges of the ring mold, means for locking said ring mold to said engaging means, and means for supporting said engaging and locking means.

3. In a device of the class described, the combination of means for supporting and shifting a ring mold and the like from a bottom mold, means for locking the ring mold to said supporting means, and means for elevating said locking means independently of said supporting means while said supporting means are effective.

4. In a mold transferring device of the class described, the combination of an arm having a plurality of finger portions stationary with respect to each other, said finger portions cooperating with said arm to form slots for engaging a flange on a ring mold and the like, and means for raising and lowering said arm to engage and release respectively the ring mold at desired intervals.

5. In a device of the class described, the combination of a laterally extending arm secured to a vertical shaft, a plurality of ring molds engaging fingers at the end of said arm adapted to engage a ring mold at the end thereof, and a second laterally extending arm mounted on said first arm said second arm having projecting means thereon for locking said ring mold to engaging fingers.

6. In a device of the class described, the combination of a rotatable mold table having blank and ring molds thereon for fabricating glass containers, an arm having means thereon for engaging the ring molds, a shaft supporting said arm, devices for removing the glass containers from the molds, mechanism for raising said shaft and arm, and a cam for oscillating said arm away from the mold table to permit removal of the container, said mechanism and cam being effective to lower and oscillate said arm toward the table to replace the ring mold.

7. In a device of the class described, the combination of an intermittently rotatable mold table, blank and ring molds thereon for fabricating glass containers, integral means for engaging the ring molds, said means being so constructed and normally so positioned as to permit the ring molds to pass through it and also positioned so that the ring mold stops in it, and devices for raising said means while the ring mold is stopped to raise the ring mold and permit removal of the container said devices being adapted to lower said ring mold when the container has been removed.

8. In a device of the class described, the combination of a vertical column, a laterally extending arm mounted on said column, having a plurality of substantially L-shaped portions at the end thereof for engaging a flange on a ring mold mounted upon a blank mold, means for vertically reciprocating said column, and a cam member mounted upon said column for oscillating said arm when said reciprocating means are effective.

9. In a device of the class described, the combination of a blank mold, a ring mold supported upon said blank mold, a vertical reciprocating rod, a cross-arm mounted on said rod, a vertical shaft attached to said arm, a horizontal arm connected to said shaft having means at the end thereof for engaging and lifting said ring mold when said reciprocating rod is raised, and a vertical rod mounted on said cross-arm and positioned to eject a molded article from the blank mold when the ring mold is raised.

10. In a device of the class described, the combination of a mold table, a blank mold on said table and a ring mold upon said blank mold for forming a glass article, a vertical air cylinder, a piston rod associated with said cylinder, a cross-arm mounted upon said piston rod, a vertical shaft connected to said cross-arm, an arm attached to said shaft having means at the end thereof for engaging the ring mold, a cam mechanism associated with said shaft for oscillating said ring mold engaging arm and the ring mold thereon away from said mold table to permit the glass article in said blank mold to be ejected, and a rod mounted on the cross-arm for ejecting the glass article from the mold.

11. In a device of the class described, the combination of an extending arm secured to a vertical shaft, integral gripping means at the free end of said arm for engaging a ring mold, a second extending arm mounted upon said first arm, said second arm having a downwardly projecting portion thereon for locking the ring mold to said first arm, means for raising said second arm independently of said first arm, and resilient means for lowering said second arm.

12. In a device of the class described, the combination of an arm having a plurality of definitely spaced fingers at one end thereof, said fingers cooperating with said arm to provide longitudinal grooves normally in the path of a ring mold on a rotating mold table for engaging the ring mold, means for supporting said arm having engaging fingers thereon, means for locking said ring mold to said arm, and means for oscillating said supporting means.

13. In a device of the class described, the combination of an arm having means thereon for engaging a ring mold while on a rotating mold table, a vertical shaft for supporting said arm, a second arm slidably mounted upon said first arm for locking said ring mold to said first arm, means for oscillating said shaft, means for raising and lowering said oscillating means, and means for raising said second arm when said first arm is lowered.

14. In a device of the class described, the combination of a rotatable mold table having a mold thereon with an upper and lower section, means for gripping the upper mold section, said means being normally stationary with respect to said rotating table, means for raising said gripping means to elevate said upper mold section and permit the removal of a molded article, and devices for removing the molded article, said raising means being effective to return said gripping means and said upper section to its proper position after the article has been removed, said upper section being rotated by said table into engagement with said gripping means prior to being raised and being rotated out of engagement therewith after being replaced upon said lower section.

15. In a device of the class described, the combination of a rotatable mold table, an upper and lower mold section for forming glass containers, said upper section having an extending portion thereon, a vertical shaft, means for reciprocating said shaft, and an arm extending over said table attached to said shaft, said arm having a plurality of portions at the end thereof forming longitudinal slots normally in position for receiving and engaging the extending portion of the upper mold section when the mold table is rotated to present the mold, whereby the upper mold section may be lifted from the lower mold section when said reciprocating shaft is raised.

16. In a device of the class described, the combination of a rotatable table, a ring mold supported on said table, normally stationary means above said table provided with a pair of definitely spaced grooves so constructed as to engage said ring mold, means for rotating said table to move said ring mold into engagement with said grooves, and means for moving said engaging means away from said table after the ring mold engages therewith to remove the ring mold from said table.

17. In a device of the class described, the combination of a rotary mold table, ring molds mounted on said table, a pair of fingers stationary with respect to each other and normally in the path of said molds for engaging successive molds, means for supporting said fingers, and means for moving said supporting means away from said table while a ring mold is engaged by said fingers.

18. In a device of the class described, the combination of a blank mold, a ring mold on said blank mold, an arm mounted independently of said ring mold adapted to engage said mold at desired intervals, means for operating said arm to remove and replace said mold, and a member on said means for elevating the ware in the blank mold when the ring mold has been removed.

19. In a device of the class described, the combination of a rotatable table, a ring mold and a blank mold on said table adapted to contain a molded article, an arm having a pair of finger portions at the end thereof, said portions cooperating with said arm to form grooves for receiving said ring mold when presented thereto, means for supporting said arm, and means for oscillating said supporting means to move said arm away from said table while engaging the ring mold to permit the container in the mold to be removed.

20. In a mold transferring device of the class described, the combination of a rotatable mold table having a series of ring molds thereon provided with an extension, a laterally extending arm mounted independently of said table, said arm having ring mold engaging means at the end thereof providing a groove normally in the same plane as the extensions on the ring molds for receiving the ring molds on said table successively, and means for rotating said arm.

21. In a device of the class described, the combination of a mold table, a mold upon said table for forming a glass article, an upright shaft adjacent to said table, pneumatic means for raising and lowering said shaft, an arm attached to said shaft having means at the end thereof for engaging the molds on said table, means associated with said shaft for oscillating said arm and the mold engaged thereby away from said table to permit the glass article formed by said mold to be removed.

22. In a mold transferring device, the combination of a mold table, a mold on said table, an arm mounted independently of said mold, means on the end of said arm for engaging said mold, means for oscillating said arm to remove and replace said mold, means mounted on said arm and freely slidable with respect thereto to move upwardly and downwardly to lock said mold on said arm, and means for raising said locking means to move said locking means out of effective position and to permit said mold to be released from said arm.

LOUIS P. PIAZZOLI, Jr.